(12) United States Patent
Hayek et al.

(10) Patent No.: US 9,076,072 B2
(45) Date of Patent: Jul. 7, 2015

(54) SYSTEM AND METHOD FOR WEB PAGE RENDERING TEST AUTOMATION SUITE

(71) Applicant: salesforce.com, inc., San Francisco, CA (US)

(72) Inventors: Neil Hayek, Pacifica, CA (US); Ang Li, Austin, TX (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/042,412

(22) Filed: Sep. 30, 2013

(65) Prior Publication Data

US 2014/0105491 A1 Apr. 17, 2014

Related U.S. Application Data (60) Provisional application No. 61/712,354, filed on Oct. 11, 2012.

(51) Int. Cl.
*G06K 9/00* (2006.01)
*G06K 9/62* (2006.01)
*G06F 17/30* (2006.01)

(52) U.S. Cl.
CPC ........ *G06K 9/6202* (2013.01); *G06F 17/30905* (2013.01); *G06F 17/3089* (2013.01)

(58) Field of Classification Search
USPC .................. 382/165, 181, 218, 221; 345/568; 430/17, 292, 293; 435/174, 183, 219; 709/203, 219, 222; 705/39, 40; 704/270.1, 256, 260; 713/2; 530/350; 977/773
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |

(Continued)

*Primary Examiner* — Anh Do
(74) *Attorney, Agent, or Firm* — Ingrassia Fisher & Lorenz, P.C.

(57) ABSTRACT

Methods and systems are provided for testing visual elements in a rendered web page. The method includes defining a gold image at a first point within a web application, taking a screen shot of an actual image at the first point during execution of the web application, and comparing the gold image to the actual image and generating a difference image based on the comparison. The difference image may include a first region highlighting a first difference between the gold image and the actual image within an area common to both images, and a second region highlighting a second difference between the gold image and the actual image which is not within an area common to both images.

20 Claims, 5 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,022,386 B2 * | 4/2006 | Suzuki .................. 428/32.8 |
| 7,062,502 B1 | 6/2006 | Kesler |
| 7,340,411 B2 | 3/2008 | Cook |
| 7,401,094 B1 | 7/2008 | Kesler |
| 7,412,455 B2 | 8/2008 | Dillon |
| 7,620,655 B2 | 11/2009 | Larsson et al. |
| 7,640,163 B2 * | 12/2009 | Charney et al. ............ 704/270.1 |
| 7,698,160 B2 | 4/2010 | Beaven et al. |
| 7,805,600 B2 * | 9/2010 | Bucher et al. ..................... 713/2 |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063414 A1 | 3/2009 | White et al. |

* cited by examiner

SYSTEM AND METHOD FOR WEB PAGE RENDERING TEST AUTOMATION SUITE

CROSS-REFERENCE TO RELATED APPLICATION

This application claims the benefit of U.S. provisional patent application Ser. No. 61/712,354, filed Oct. 11, 2012, the entire contents of which are incorporated herein by this reference.

TECHNICAL FIELD

Embodiments of the subject matter described herein relate generally to computer systems and applications for reliably validating the integrity of a web based user interface (UI), and more particularly to test automation tools that enable users to write automated tests for rendering user interfaces in an on demand environment.

BACKGROUND

Software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software s between multiple sets of users.

Both within and outside of on-demand or multi-tenant computing environments, changes in the cascading style sheet (CSS) or other Javascript™ code can affect the visual aspects of the user experience. In a large code base where several development teams typically work on different aspects of the code, a change intended to improve one area can have unintended consequences in another area of the user interface (UI).

For example, when the visual appearance of a feature is changed, the modified code may be shared by other developers. Problematically, is it often difficult to know at the time of the modification the various ways in which that same code may be used by other development teams. Mature and robust systems have been developed for managing the functionality of code developed in a multiple team environment, such as Selenium™ 1.0+WebDriver available at http://docs.seleniumhq.org/projects/webdriver/. However, presently known automated tools do not adequately manage the testing and debugging of the visual or stylistic aspects of the UI across multiple development teams.

Systems and methods are thus needed which overcome the foregoing shortcomings.

BRIEF DESCRIPTION OF THE DRAWING FIGURES

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to systems and methods for writing automated tests for web-based user interface rendering.

Figure 1:
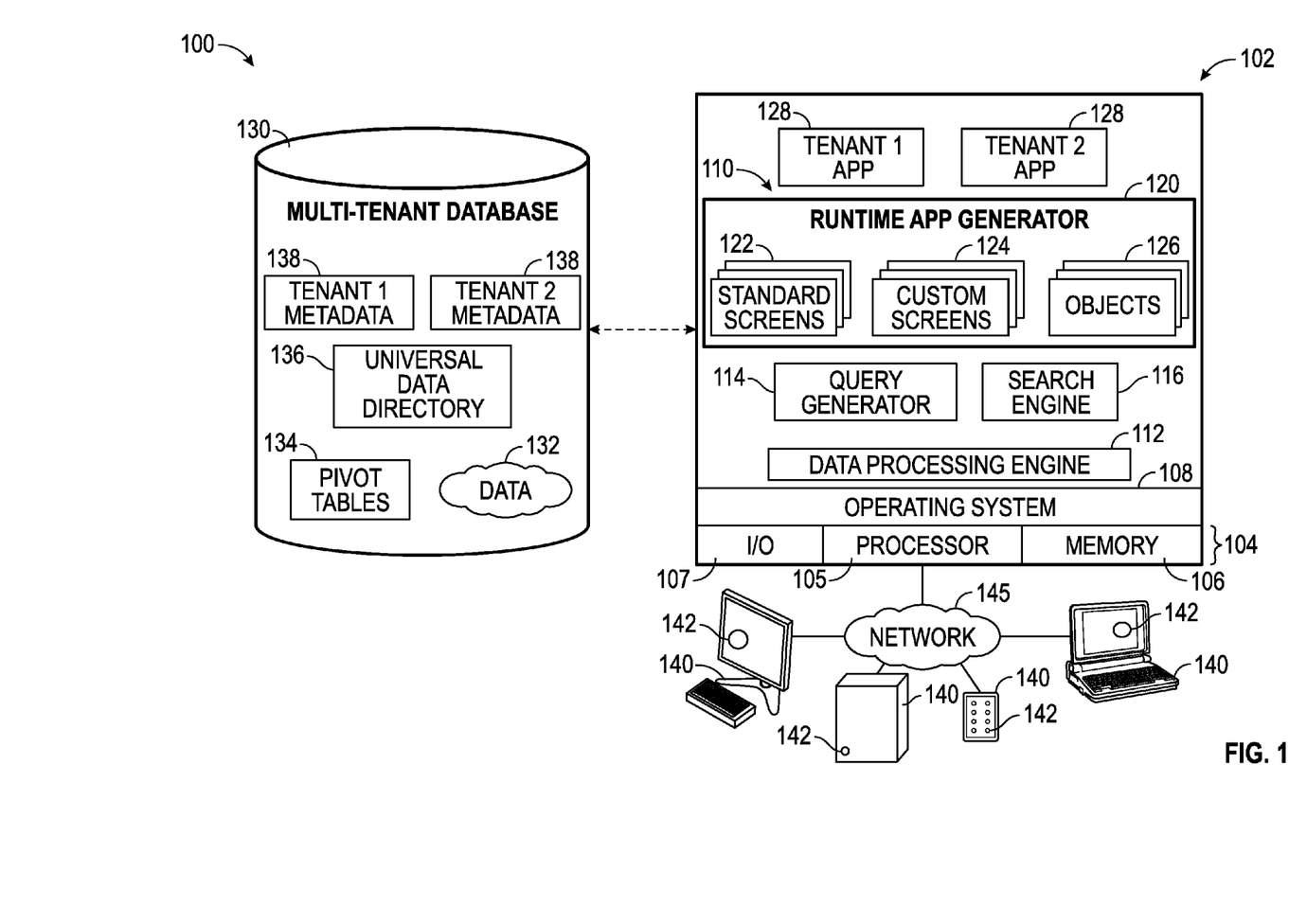
FIG. 1 is a schematic block diagram of a multi-tenant computing environment in accordance with an embodiment.

Turning now to FIG. 1, an exemplary cloud based solution may be implemented in the context of a multi-tenant system 100 including a server 102 that supports applications 128 based upon data 132 from a database 130 that may be shared between multiple tenants, organizations, or enterprises, referred to herein as a multi-tenant database. Data and services generated by the various applications 128 are provided via a network 145 to any number of client devices 140, such as desk tops, laptops, tablets, smartphones, Google Glass™, and any other computing device implemented in an automobile, aircraft, television, or other business or consumer electronic device or system, including web clients.

An alternative vector into the automatic syncing and sharing may be implemented by an application protocol interface (API), either in lieu of or in addition to the client application 142. In this way, a developer may create custom applications/interfaces to drive the sharing of data and/or files (and receive updates) with the same collaboration benefits provided by the client application 142.

Each application 128 is suitably generated at run-time (or on-demand) using a common application platform 110 that securely provides access to the data 132 in the database 130 for each of the various tenant organizations subscribing to the service cloud 100. In accordance with one non-limiting example, the service cloud 100 is implemented in the form of an on-demand multi-tenant customer relationship management (CRM) system that can support any number of authenticated users for a plurality of tenants.

As used herein, a "tenant" or an "organization" should be understood as referring to a group of one or more users (typically employees) that shares access to common subset of the data within the multi-tenant database 130. In this regard, each tenant includes one or more users and/or groups associated with, authorized by, or otherwise belonging to that respective tenant. Stated another way, each respective user within the multi-tenant system 100 is associated with, assigned to, or otherwise belongs to a particular one of the plurality of enterprises supported by the system 100.

Each enterprise tenant may represent a company, corporate department, business or legal organization, and/or any other entities that maintain data for particular sets of users (such as their respective employees or customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other organizations.

The multi-tenant database 130 may be a repository or other data storage system capable of storing and managing the data 132 associated with any number of tenant organizations. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein.

In an exemplary embodiment, the database 130 includes a database management system or other equivalent software capable of determining an optimal query plan for retrieving and providing a particular subset of the data 132 to an instance of application (or virtual application) 128 in response to a query initiated or otherwise provided by an application 128, as described in greater detail below. The multi-tenant database 130 may alternatively be referred to herein as an on-demand database, in that the database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants.

Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like.

The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system.

The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below.

Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. However, if a user chooses to manually upload an updated file (through either the web based user interface or through an API), it will also be shared automatically with all of the users/devices that are designated for sharing.

As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In various embodiments, virtual application 128 may include automated tools for reliably testing and debugging web-based user interface rendering applications. By way of non-limiting example, when a user clicks on a link inside a page to share or edit a file, instead of loading a new page an overlay pops up, graphically directing the user to interact within the pop up to execute the file share or delete function. This "pop up" type interaction mechanism may be used in multiple environments (or contexts) within the user experience; consequently, changes made to the overlay in one environment must be carefully managed to avoid introducing unwanted UI artifacts in other environments.

For example, even a purely stylistic or visual artifact, such as reducing the size of a pop up window, could also impact usability if, for example, the reduced window size results in a button not being visible to the user. By properly managing the visual aspects such as the size, color, orientation, and appearance of text and graphics within a UI, the user experience may exhibit a consistent look and feel, stylization, and branding even though different development teams may simultaneously access the same shared code within an organization.

Presently known techniques for testing and debugging the visual aspects of revised shared code surround manually inspecting the UI for unintended problems. In various embodiments of the present disclosure, a suite of automated quality control tools is provided for comparing, for example on a pixel-by-pixel basis, an actual web page under test to a "gold image" (an approved reference image) to produce "difference" file. In an embodiment, a new "current" or "actual" screen shot is taken periodically such as once per hour, day, or based on any desired configurable metric. The actual image file is compared to the then current gold file. As long as there are no differences between the actual image and the gold image, the then current gold file remains as the base reference against which subsequent actual image files are compared.

Once the test fails, i.e., when the comparison yields differences between the gold image file and the actual image file, the difference file (DIFF file) is examined to determine the nature and/or quality of the differences. If the differences are acceptable, that is, if the actual image includes changes deemed desirable or appropriate, then most recent actual image which caused the test failure becomes the new gold file going forward. If, on the other hand, the changes are not acceptable, the test is deemed "broken" by the actual image, and a work order, ticket, or other "bug fix" mechanism is employed to address the changes in the actual image which produced the break. The then current gold image remains as the basis for comparing subsequent actual images, until a test failure resulting from an acceptable change occurs.

The foregoing scheme tends to be cumbersome inasmuch as a new gold file is created every time an acceptable change is encountered during testing of the code, resulting in a high degree of noise over time. That is, because of the increasing complexity of web pages, even a trivial difference can result in a test failure. Accordingly, the present disclosure also provides techniques for filtering or otherwise reducing the screen shot data which is subject to the comparison to only those aspects of the web page deemed sufficiently important by the test developer to warrant testing.

More particularly, an exemplary test tool provides the test designer with the ability to define which web elements are to be included in—and which web elements are to be excluded from—the differencing analysis. This is, the relative importance of the various web elements may be subjectively determined based on the quality engineer's understanding of the product being tested. In this regard, the web page is typically in the form of a nested tree of web elements in HTML code. The test designer may specifically identify only those web elements (or levels of elements) for inclusion in, or exclusion from, the gold image. In this way, noise may be reduced because web elements not relevant to the test can be excluded from the gold image and thereby avoid false negative test failures.

Those skilled in the art will also appreciate that a gold image may be defined at one or more points associated with higher priority process and features as determined, at least in part, by the subjective judgment of the developer and/or quality control engineer. Having determined the points at which a gold image is to be taken, and the subset of elements to be included in the gold image, the tools described herein further assist the developer in managing the difference images and files produced when a test fails, as described in greater detail below in conjunction with FIG. 4.

In this regard, a subset of the entire web page may be initially defined as the current gold image (e.g., JPEG or other image file format). Thereafter, a test screen shot is periodically taken at the same point within the application, and an "actual image" file of the test screen shot is compared to the previously stored gold image file. In an embodiment, an automation tool (without requiring end user interaction) may be employed to create the actual image file.

If there is substantial or verbatim correspondence between the gold image file and the actual image file, no difference file is generated and the then current gold image file is used as the basis for comparing subsequent test screen shots. If, on the other hand, the comparison yields a difference file, a corresponding DIFF Image may be used to evaluate the nature of the differences. If the differences relate to changes deemed acceptable from a quality control standpoint, the test image becomes the new gold image going forward. If, on the other hand, the differences are not acceptable, the application is revised to fix the problematic code.

In practice, many tests are run daily on a system running shared code. Typically, most tests pass, and require no further analysis. When a test fails, a DIFF file is created, and the reviewer reviews the DIFF file to determine whether the code is broken, i.e., whether the test failure relates to an unacceptable difference between the gold file and the test file.

In accordance with various embodiments, tools and techniques are provided for assisting the developer, quality control engineer, or other product team member in evaluating the difference file (or DIFF image) to determine whether the differences are acceptable. In this regard, generating a DIFF image allows the reviewer to quickly and efficiently identify the nature of the differences between the gold image and the actual image. Accordingly, in an embodiment, a color coded DIFF image may be presented for review. Alternatively, highlighting, shading, or other graphical techniques may be employed as visual cues to point out the differences—and the nature of the differences—to the reviewer, as described in greater detail below in connection with FIG. 4.

Figure 2:
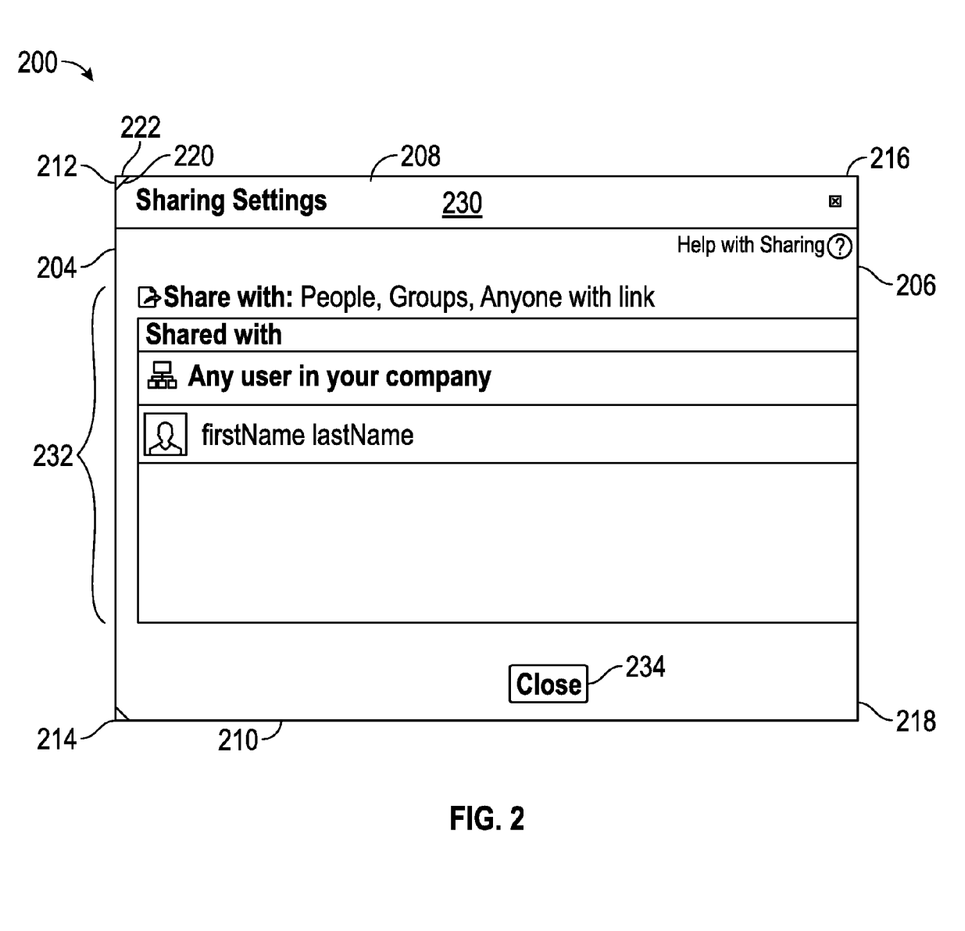
FIG. 2 is a screen shot of a gold image of an expected pop up window in accordance with an embodiment.

Referring now to FIG. 2, a screen shot 200 of an expected overlay, for example, a pop up window, may be designated as a gold image having a corresponding gold image file. In defining the gold image, the designer may include the entire overlay or a subset thereof. In the illustrated embodiment, the gold image includes a number of rendered elements, including a header element 230, a group of elements which together define an interaction module 232, and a close button 234.

The gold image represented by the screen shot 200 may be characterized by a left border 204, a right border 206, an top border 208, a bottom border 210, an upper left corner 212, a lower left corner 214, an upper right corner 216, and a lower right corner 218. To facilitate the ensuing discussion, the image of FIG. 2 may also be characterized as a 3×3 inch square (not to scale).

Figure 3:
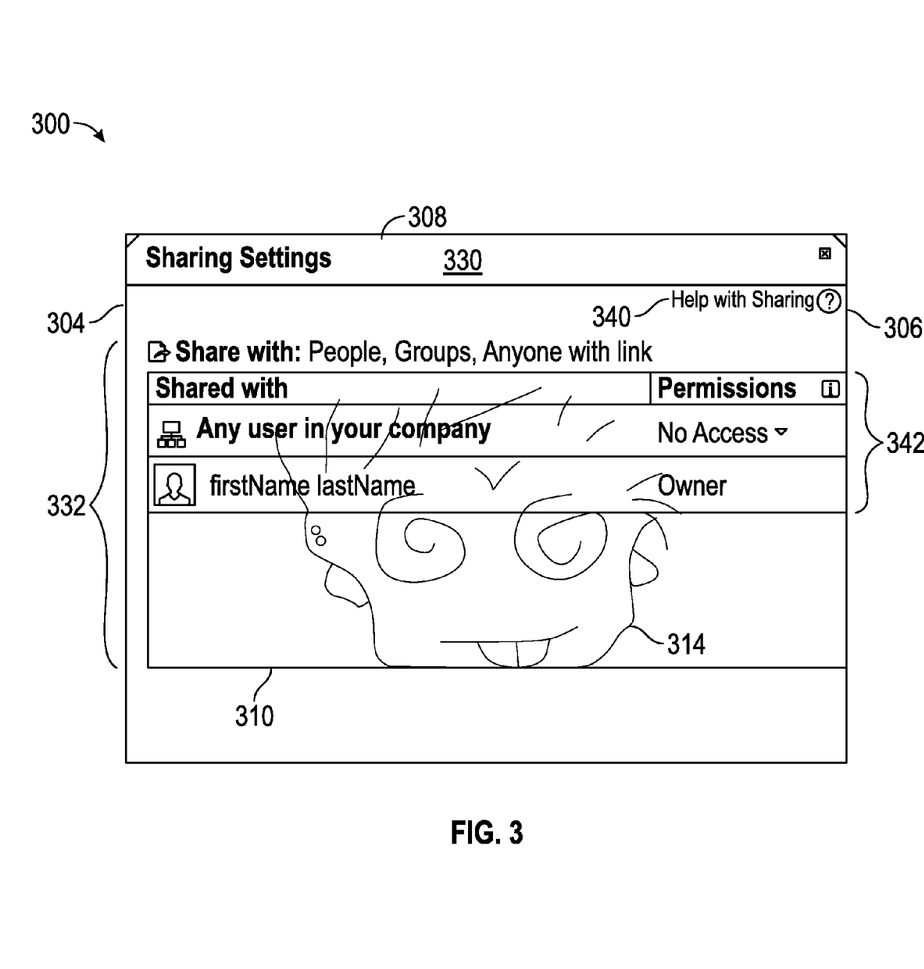
FIG. 3 is a screen shot of an actual image of the pop up window shown in FIG. 2 in accordance with an embodiment.

FIG. 3 is a screen shot 300 of an actual image (test image) of the pop up window shown in FIG. 2. In particular, screen shot 300 includes a header element 330, a group of elements forming an interaction module 332, and a close button 334. The screen shot 300 may be characterized by a left border 304, a right border 306, a top border 308, a bottom border 310, a help element 340, and a group of elements which together make up a second interaction module 342. The image of FIG. 3 may be characterized as a 4×2 inch rectangle (not to scale).

The screen shot 300 further includes an anomaly, artifact, or undesired data element such as an image 314. In the illustrated embodiment, the image 314 is a face; however, those skilled in the art will appreciate that artifacts may take virtually any textual or graphical form.

As described in detail above, in accordance with various embodiments the gold image 200 may be compared with the actual image 300, and a DIFF file (and related DIFF image) produced which includes the differences therebetween. In the illustrated example the differences include an unintended (and therefore unacceptable) element, namely, image 314, as well as differences attributable to the difference in size between the gold image (3×3) and the actual image (4×2).

Figure 4:
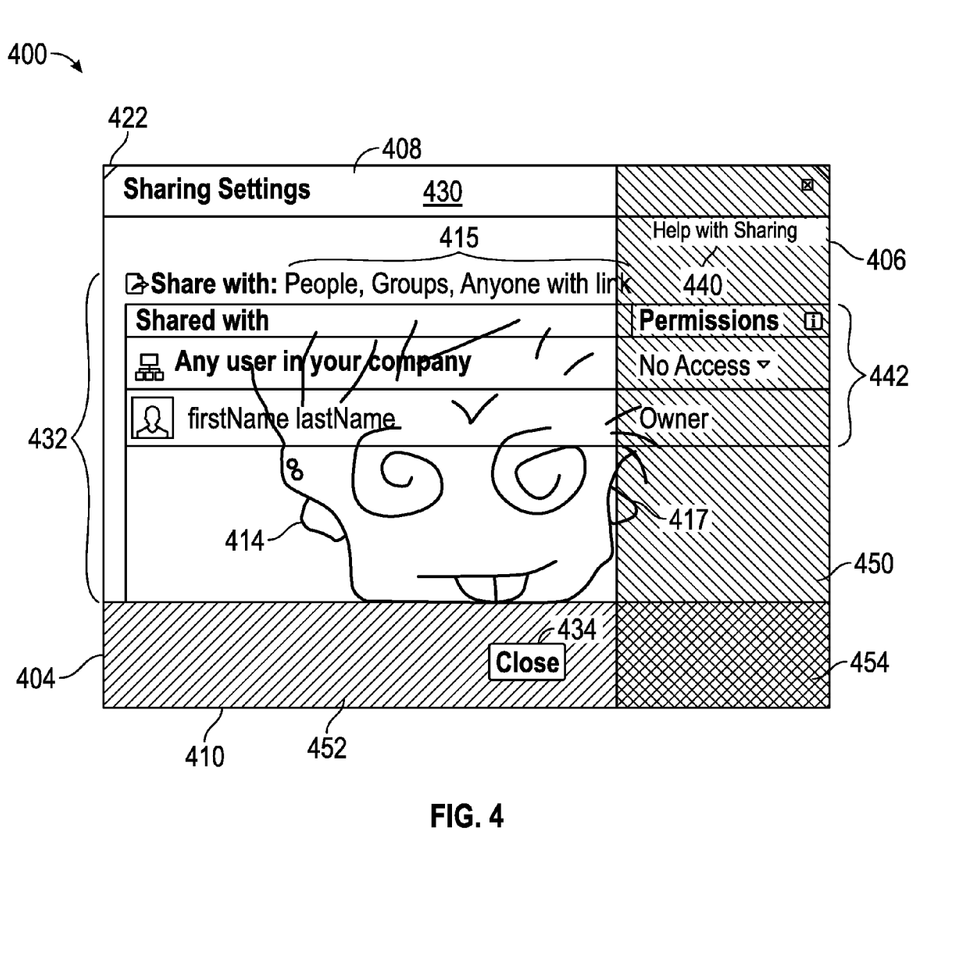
FIG. 4 is a screen shot of a difference image comparing the gold image of FIG. 2 to the actual image of FIG. 3 in accordance with an embodiment.

FIG. 4 is a screen shot 400 of a difference image highlighting the differences between the gold image of FIG. 2 and the actual image of FIG. 3 in accordance with an embodiment. More particularly, the screen shot 400 includes a header element 430, a group of elements forming an interaction module 432, and a close button 434. The screen shot 400 may be characterized by a left border 404, a right border 406, a top border 408, a bottom border 410, a help element 440, a group of elements forming a second interaction module 442, and an image 414. The image of FIG. 4 may be characterized as a rectangle 4 inches in length and 3 inches high (not to scale).

In accordance with various embodiments, the following color scheme may be used to represent the comparison between the gold image 200 and the actual image 300:

i) Red indicates the differences which lie within the common areas of the two images;
ii) Blue indicates the area present in the gold image but not in the actual image;
iii) Yellow indicates the area present in the actual image but not in the gold image; and
iv) Grey indicates the padding area that is in neither of the images.

If the gold image and the actual image are the same size, the DIFF image would only include red differences, not blue or yellow differences. However, since the two images are of different sizes, the DIFF image shown in screen shot 400 includes a first (e.g., red) portion 415 of the image 414 located within the original 3×3 frame of the gold image, a "yellow" region 450, a "blue" region 452, and a "grey" region 454. The blue region 452 includes the close button 434. The yellow region 450 includes the help button 440 and the second module 442. The grey region 454 contains no graphical or textual elements in the illustrated example, but is nonetheless included for completeness to indicate the padding area that is in neither of the images.

As briefly discussed above, screen shots are typically taken as rectangles. However, for stylistic reasons some web pages may have non-rectangular (e.g., rounded) corners. In accordance with a further embodiment, it may be advantageous to mask the rectangular portion 222 of the screen shot 200 that is not part of the web page under inspection to avoid false negative test failures.

In accordance with a further embodiment, if the gold image does not include a feature or element anticipated to change in the actual image, such as a time stamp, weather icon, or the like, the tool allows for "masking" of the time stamp or analogous element. Specifically, an embodiment of the tool allows the designer to specify a part of the web page to be excluded from the test image to avoid test failures due a predictable artifact.

Figure 5:
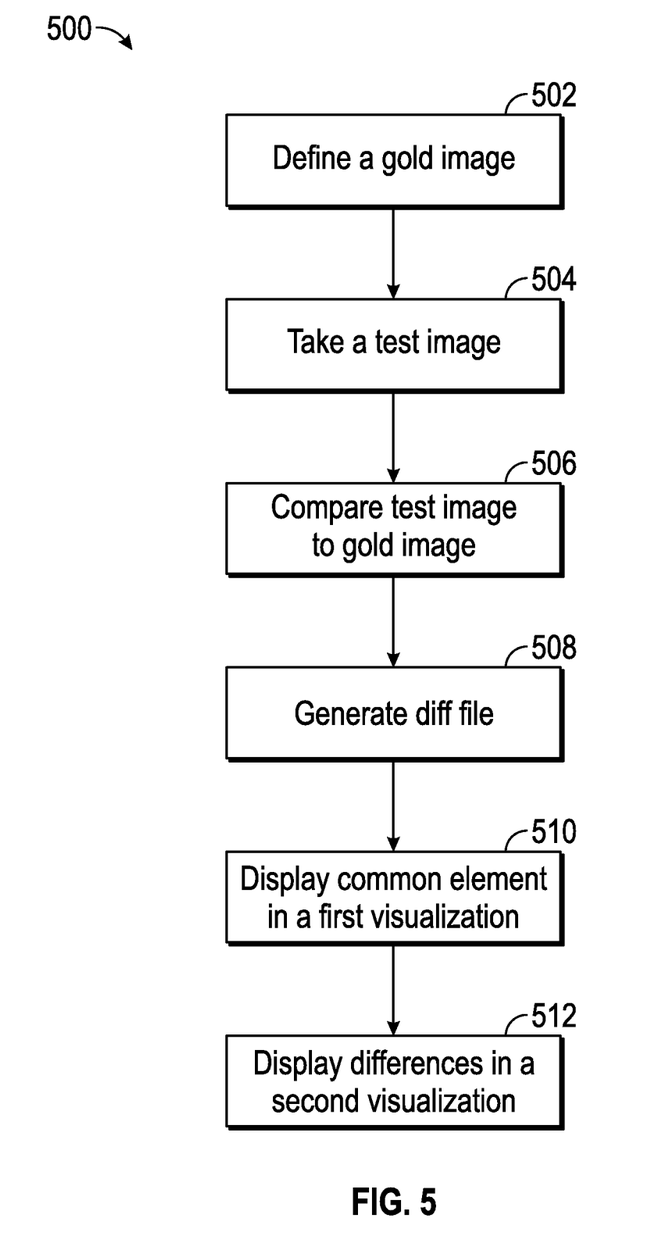
FIG. 5 is a flow diagram of an exemplary method of reliably validating the integrity of shared code.

FIG. 5 is a flow diagram of an exemplary method 500 for reliably testing the integrity of shard code in accordance with an embodiment. More particularly, the method 500 includes defining a gold image (Task 502), taking a test image (Task 504), and comparing the test image to the gold image (Task 506). The method 500 further includes generating (Task 508) a difference file based on the comparison, displaying the common elements (Task 510) in a first visualization (e.g., a first color), and displaying the differences elements (Task 512) in a second visualization (e.g., a second color).

Although various embodiments are set forth in the context of a multi-tenant or on-demand environment, the systems and methods described herein are not so limited. For example, they may also be implemented in enterprise, single tenant, and/or stand-alone computing environments.

A method is thus provided for automating testing visual elements in a rendered web page. The method includes: defining a gold image at a first point within a web application; taking a screen shot of an actual image at the first point during execution of the web application; and comparing the gold image to the actual image and generating a difference image based on the comparison. The difference image includes: a first region highlighting a first difference between the gold image and the actual image within an area common to both images; and a second region highlighting a second difference between the gold image and the actual image which is not within an area common to both images.

In an embodiment, the gold image may be compared to the actual image on a pixel-by-pixel basis.

In an embodiment, the first region is highlighted using a first color, and the second region is highlighted using a second color which is not the first color.

In an embodiment of the method, the gold image is substantially rectangular having a height A and a width B, the actual image is substantially rectangular having a height C and a width D, and the difference image is substantially rectangular having a height which is the greater of A and C and having a width which is the greater of B and D.

In an embodiment, highlighting comprises creating a visual contrast using at least one of color, shading, font, and stylization.

In another embodiment, the rendered web page includes a plurality of nested web elements, and defining the gold image includes identifying a subset of the web elements for inclusion in the gold image.

In various embodiments, the second region includes a first portion highlighting an area present in the gold image but not in the actual image, the second region comprises a second portion highlighting an area present in the actual image but not in the gold image, and the second region further comprises a third portion highlighting an area that is not present in the actual image and not present in the gold image.

In an embodiment, the first region is highlighted using a first color, the first portion is highlighted using a second color, the second portion is highlighted using a third color, and the third portion is highlighted using a fourth color.

In another embodiment, taking the screen shot of the actual image includes masking an element which is expected to be in the actual image but which is not in the gold image.

In an embodiment of the method, defining a gold image further comprises creating a gold image data file corresponding to the gold image; taking a screen shot of the actual image further comprises creating an actual image data file corresponding to the actual image; and comparing comprises automatically, without end user interaction, comparing the gold image data file with the actual image data file on a pixel-by-pixel basis.

In an embodiment, the method includes evaluating the difference image to determine whether the first difference is acceptable; and if the first difference is acceptable, replacing the gold image with the actual image. The method may also include fixing the first difference if the first difference is unacceptable.

A method of testing a block of code used for rendering a web page is also provided. The method includes: defining a gold image at a predetermined point within the code block; taking a test image of a rendered web page at the predetermined point; comparing the test image to the gold image; producing a DIFF file comprising at least one difference between the test image and the gold image based on the comparison; and displaying a DIFF image based on the DIFF image file. In an embodiment, displaying the DIFF image comprises displaying the elements common to the gold image and the test image using a first visualization, and displaying the at least one difference in a second visualization different from the first visualization.

In an embodiment the first visualization comprises a first color, and the second visualization comprises a second color.

In an embodiment of the method, the web page comprises a plurality of nested web elements, and defining the gold image comprises prompting a test designer to select a subset of the web elements for inclusion in the gold image.

Computer code embodied in a non-transitory medium for operation by a processing system is also provided for performing the steps of: defining a gold image comprising a subset of web elements associated with a web page to be rendered; taking a screen shot of the rendered web page; comparing the screen shot to the gold image; and displaying the common elements between the gold image and the screen shot in a first color and simultaneously displaying the differences between the gold image and the screen shot in a second color.

In an embodiment, the computer code is configured for operation in a multi-tenant on demand computing environment.

In an embodiment, comparing comprises automatically (e.g., without end user interaction) comparing the gold image data file with the actual image data file on a pixel-by-pixel basis.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions.

For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed:

1. A computer-executable application embodied in a non-transitory medium for operation by a computer processor for implementing a method of testing visual elements in a rendered web page, the method comprising:
defining, with the computer processor, a gold image at a first point within a web application;
taking a screen shot of an actual image at the first point during execution of the web application with the computer processor; and
comparing, with the computer processor, the gold image to the actual image and generating a difference image based on the comparison;
wherein the difference image comprises:
a first region highlighting a first difference between the gold image and the actual image within an area common to both images; and
a second region highlighting a second difference between the gold image and the actual image which is not within an area common to both images.

2. The method of claim 1, wherein comparing comprises comparing the gold image to the actual image on a pixel-by-pixel basis.

3. The method of claim 1, wherein the first region is highlighted using a first color, and the second region is highlighted using a second color which is not the first color.

4. The method of claim 1, wherein the gold image is substantially rectangular having a height A and a width B, the actual image is substantially rectangular having a height C and a width D, and the difference image is substantially rectangular having a height which is the greater of A and C and having a width which is the greater of B and D.

5. The method of claim 4, wherein highlighting comprises creating a visual contrast using at least one of color, shading, font, and stylization.

6. The method of claim 1, wherein the rendered web page comprises a plurality of nested web elements, and further wherein defining the gold image comprises identifying a subset of the web elements for inclusion in the gold image.

7. The method of claim 1, wherein the second region comprises a first portion highlighting an area present in the gold image but not in the actual image.

8. The method of claim 7, wherein the second region further comprises a second portion highlighting an area present in the actual image but not in the gold image.

9. The method of claim 8, wherein the second region further comprises a third portion highlighting an area that is not present in the actual image and not present in the gold image.

10. The method of claim 9, wherein the first region is highlighted using a first color, the first portion is highlighted using a second color, the second portion is highlighted using a third color, and the third portion is highlighted using a fourth color.

11. The method of claim 1, wherein taking the screen shot of the actual image comprises masking an element which is expected to be in the actual image but which is not in the gold image.

12. The method of claim 1, wherein:
defining a gold image further comprises creating a gold image data file corresponding to the gold image;
taking a screen shot of the actual image further comprises creating an actual image data file corresponding to the actual image; and
comparing comprises automatically, without end user interaction, comparing the gold image data file with the actual image data file on a pixel-by-pixel basis.

13. The method of claim 1, further comprising:
evaluating the difference image to determine whether the first difference is acceptable; and
if the first difference is acceptable, replacing the gold image with the actual image.

14. The method of claim 13, further comprising fixing the first difference if the first difference is unacceptable.

15. A computer-executable method of testing a block of code used for rendering a web page, comprising:
defining, with a processor of a computing system programmed to perform the computer-executable method, a gold image at a predetermined point within the code block;
taking, with the processor of the computing system, a test image of a rendered web page at the predetermined point;
comparing, with the processor of the computing system, the test image to the gold image;
producing, with the processor of the computing system, a DIFF file comprising at least one difference between the test image and the gold image based on the comparison; and
displaying a DIFF image based on the DIFF image file;
wherein displaying the DIFF image comprises:
displaying the elements common to the gold image and the test image using a first visualization; and
displaying the at least one difference in a second visualization different from the first visualization.

16. The method of claim 15, wherein the first visualization comprises a first color, and the second visualization comprises a second color.

17. The method of claim 15, wherein the web page comprises a plurality of nested web elements, and further wherein defining the gold image comprises prompting a test designer to select a subset of the web elements for inclusion in the gold image.

18. Computer code embodied in a non-transitory medium for operation by a processing system for performing the steps of:
defining a gold image comprising a subset of web elements associated with a web page to be rendered;
taking a screen shot of the rendered web page;
comparing the screen shot to the gold image to obtain common elements between the gold image and the screen shot; and
displaying the common elements between the gold image and the screen shot in a first color and simultaneously displaying the differences between the gold image and the screen shot in a second color.

19. The computer code of claim 18 configured for operation in a multi-tenant on demand computing environment.

20. The computer code of claim 18, wherein comparing comprises automatically, without end user interaction, comparing the gold image with the screen shot on a pixel-by-pixel basis.

* * * * *